US007647970B2

(12) United States Patent
Mueller et al.

(10) Patent No.: US 7,647,970 B2
(45) Date of Patent: Jan. 19, 2010

(54) SELF-SEALING WELL CEMENT COMPOSITION

(75) Inventors: Dan Thomas Mueller, Cypress, TX (US); Harold Dean Brannon, Magnolia, TX (US); Windell Scott Bray, Cypress, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 11/958,262

(22) Filed: Dec. 17, 2007

(65) Prior Publication Data

US 2008/0099203 A1 May 1, 2008

Related U.S. Application Data

(60) Continuation-in-part of application No. 11/598,382, filed on Nov. 13, 2006, now Pat. No. 7,442,249, which is a division of application No. 10/605,946, filed on Nov. 7, 2003, now Pat. No. 7,156,173.

(60) Provisional application No. 60/424,751, filed on Nov. 8, 2002.

(51) Int. Cl.
*E21B 33/138* (2006.01)
(52) U.S. Cl. ........................ 166/293; 166/283; 166/300; 106/724
(58) Field of Classification Search .................. None
See application file for complete search history.

(56) References Cited

U.S. PATENT DOCUMENTS

| 4,036,301 | A | * | 7/1977 | Powers et al. | ................ 166/293 |
| 4,090,561 | A | | 5/1978 | Powell | ........................ 166/292 |
| 4,234,344 | A | | 11/1980 | Tinsley et al. | .................. 106/88 |
| 4,370,166 | A | | 1/1983 | Powers et al. | ................... 106/97 |
| 4,556,109 | A | | 12/1985 | Eilers | ......................... 166/295 |
| 5,696,059 | A | | 12/1997 | Onan et al. | ................... 507/269 |
| 6,330,917 | B2 | | 12/2001 | Chatterji et al. | ............. 166/295 |
| 2003/0018106 | A1 | * | 1/2003 | Sylvester | ..................... 524/60 |
| 2004/0107875 | A1 | | 6/2004 | Drochon et al. | ............. 106/714 |
| 2007/0137528 | A1 | * | 6/2007 | Le Roy-Delage et al. | ... 106/718 |

FOREIGN PATENT DOCUMENTS

| EP | 0347092 A3 | 6/1989 |
| EP | 0621247 A3 | 4/1994 |
| GB | 2062605 A | 11/1979 |
| GB | 2362881 A | 11/1998 |
| GB | 2387593 A | 4/2002 |
| WO | WO 90/11977 | 4/1990 |
| WO | WO 01/87796 A1 | 5/2001 |
| WO | WO 02/83590 A3 | 4/2002 |

OTHER PUBLICATIONS

Dale P. Bentz et al., "*Experimental and Simulation Studies of the Interfacial Zone in Concrete*;" National Institute of Standards and Technology, 1991; vol. 22, No. 5, pp. 891-902.
K. Vivekanandam et al.; *Transition Zone in High Performance Concrete During Hydration*; Cement and Concrete Research, 1997, vol. 27, No. 6, pp. 817-823.
K.J. Goodwin et al.; "*Cement Sheath Stress Failure*;" SPE 20453, 1990, pp. 495-508.
W. Deeg et al., "*How Foamed Cement Advantages Extend to Hydraulic Fracturing Operations*," Production Technology, World Oil 1999, 4 pages.
Dan Mueller; "*An Evaluation of Well Cements for Use in High Stress Environments*;" Hart's Petroleum Engineer International, Apr. 1998, pp. 91, 93.
Phil Rae et al., "*Cement Design Using a Computer Model to Predict Zonal Isolation*;" SPE/GSTT-WC06, pp. 1-12.
Gino di Lullo et al., "*Cements for Long Term-Design Optimization by Computer Modelling and Prediction*," IADC/SPE 62745, 7 pages.
M.J. Thiercelin, et al., "*Cement Design Based on Cement Mechanical Response*;" SPE 38598, 1997, pp. 1-23.
K.L. Scrivener et al., "*The Percolation of Pore Space in the Cement Paste/Aggregate Interfacial Zone of Concrete*;" vol. 26, No. 1, pp. 35-40.
R.R. Hengst et al., "*Fracture of Foamed Portland Cements*;" Cement and Concrete Research, vol. 13, pp. 127-134, 1983.
T. Budi Aulia, et al.; "*Effect of Mechanical Properties of Aggregate on the Ductility of High Performance Concrete*;" LACER No. 4, 1999, pp. 133-148.
G. Appa Rao and B.K. Raghu Prasad, Indian Institute of Science and University of Tirupati, India, "*Fracture Properties and Size Effect in HPC*;" 3 pages.
D.P. Bentz (2000), "*Fibers, Percolation, and Spalling of High Performance Concrete*;" ACI Materials Journal, http://www.bfrl.nist.gov/862/vcctl/software/hcss/firefiber/acicolor1.htm, printed Jun. 28, 2002, 13 pages.
D.P. Bentz (1997), "*Three-Dimensional Computer Simulation of Portland Cement Hydration and Microstructure Development*;" J. Am. Ceram. Soc. 80, pp. 3-21.
M. Thiercelin et al., (1998) "*A Soil Mechanics Approach to Predict Cement Sheath Behavior*;" SPE/ISRM 47375, pp. 329-337.
W.W. Fleckenstein, et al., (2001), "*Burst-Induced Stresses in Cemented Wellbores*;" SPE Drilling & Completion, pp. 74-80, 82.

(Continued)

*Primary Examiner*—Zakiya W. Bates
(74) *Attorney, Agent, or Firm*—Howrey LLP

(57) ABSTRACT

A cement composition is provided including a cement and a low reactivity particle coated with a swellable polymeric material. The low reactivity particle is coated with a swellable polymeric material at a concentration of about 10 weight percent to about 50 weight percent, based on the weight of the cement. The swellable polymeric material swells to a larger volume when exposed to one or more hydrocarbons, depending on the selected polymeric material. The cement composition is used in a method as a self-sealing cement for cementing an oil and gas well, thereby minimizing or mitigating the unwanted migration of water or hydrocarbons.

12 Claims, 1 Drawing Sheet

OTHER PUBLICATIONS

J. D. McLennan et al., (2002); "*Some Advances in Near Wellbore Geomechanics*;" SPE/ISRM 78194, pp. 1-13.

S-8C Product Information Sheet, found at http://www.bjservices.com/website/ps.nsf/0/4BC2AFF9863273AB86256BC9004EE1DE/$file/S-8-S-8C.pdf (2 pgs).

Examination Opinion for GB Patent Application GB0326166.6 dated Apr. 29, 2004.

Search Report Under Section 17 for GB Patent Application GB0326166.6 dated Apr. 29, 2004.

Examination Report under Section 18(3) for GB Patent Application GB0326166.6 dated Feb. 23, 2006.

Examination Report under Section 18(3) for GB Patent Application GB0326166.6 dated Oct. 5, 2006.

Examination Report under Section 18(3) for GB Patent Application GB0326166.6 dated Jun. 21, 2007.

* cited by examiner

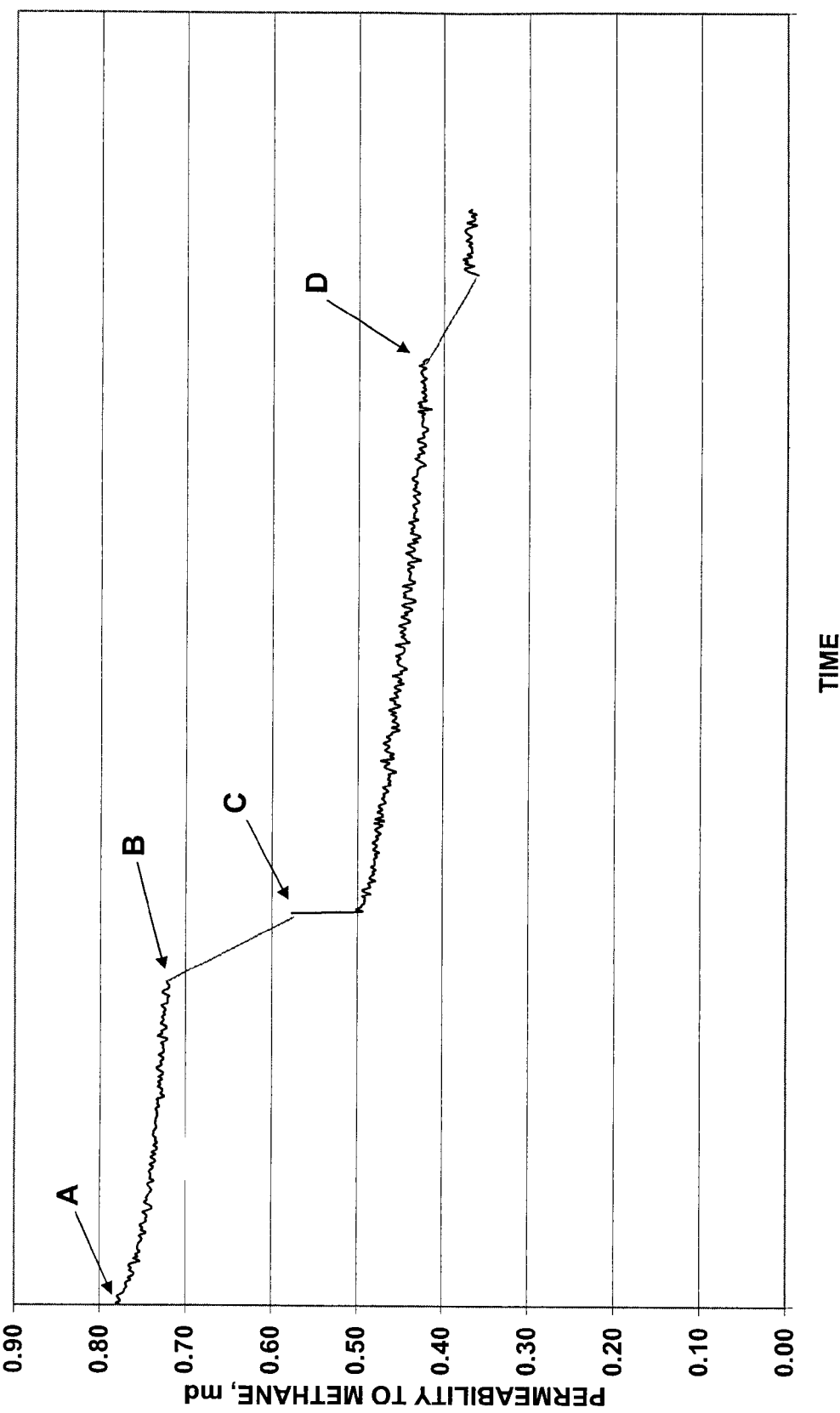

SELF-SEALING WELL CEMENT COMPOSITION

CROSS REFERENCE TO RELATED APPLICATIONS

The present application is a continuation-in-part application of U.S. patent application Ser. No. 11/598,382, which is a divisional application to U.S. patent application Ser. No. 10/605,946, now U.S. Pat. No. 7,156,173, which claims priority to U.S. Provisional Patent Application Ser. No. 60/424,751 filed Nov. 8, 2002, the contents of each are incorporated by reference herein in their entireties.

BACKGROUND OF THE INVENTION

The present invention relates generally to novel cement compositions and, more specifically, to cement compositions that are suitable for the high temperature, high pressure conditions commonly found in oil and gas wells. In particular, highly resilient cement compositions having improved sealing properties are disclosed.

Cement is commonly used to seal the wellbore of oil and gas wells. The downhole conditions of wells pose extreme conditions for the cement, exposing it to high temperatures, high pressures, and variable tectonic forces. These conditions frequently lead to the formation of fractures in the concrete, and ultimately failure and collapse of the cement. This damage decreases the production of the well, and may require treatment of the well to repair or replace the cement.

Cementing is a common technique employed during many phases of wellbore operations. For example, cement may be employed to isolate or secure various casing strings and/or liners in a well. In other cases, cementing may be used in remedial operations to repair casing and/or to achieve formation isolation. In still other cases, cementing may be employed during well abandonment.

Cement operations performed in wellbores under high stress conditions may present particular problems, among other things, difficulty in obtaining good wellbore isolation and/or maintaining mechanical integrity of the wellbore over the life of the well. Typical well operations including well production, well testing, and/or hydraulic fracturing operations can produce both radial and tangential stresses in the cemented annulus. The induced stress causes fractures within the cement sheath which lead to fluid intrusion into the wellbore, including intrusion of water, gas, or other fluids. These fractures may also serve as conduits for the intrazonal or interzonal migration of hydrocarbons. Sustained casing pressure and gas charging of shallow potable water zones are but two examples of loss of zonal isolation due to post-cementing stress events.

In a wellbore, cement may be used to serve several purposes. Among these purposes are to selectively isolate particular areas of a wellbore from other areas of the wellbore. For example, cement is commonly placed in the annulus created between the outside surface of a pipe string and the inside formation surface or wall of a wellbore in order to form a sheath to seal off fluid and/or solid production from formations penetrated by the wellbore. This isolation allows a wellbore to be selectively completed to allow production from, or injection into, one or more productive formations penetrated by the wellbore. In other cases cement may be used for purposes including, but not limited to, sealing off perforations, repairing casing leaks (including leaks from damaged areas of the casing), plugging back or sealing off the lower section of a wellbore, sealing the interior of a wellbore during abandonment operations, and so on.

The economic success of a drilling operation often hinges upon the ability to establish zonal isolation within a cemented wellbore. Once established, maintaining this zonal isolation is typically impacted by the particular stress environment found while the well is being completed and produced. During the life of a well, the cement sheath may be exposed to stresses imposed by well operations including perforating, hydraulic fracturing, high temperature-pressure differentials, and so on. Further, if the well is completed using a complex completion such as a multi-lateral system, the cement sheath may be subject to shattering and subsequent loss of bond due to pipe impact.

Conventional well cement compositions are typically brittle when cured. These conventional cement compositions often fail due to stresses, such as radial and/or tangential stresses, that are exerted on the set cement. Wellbore cements may be subjected to radial and tangential stresses that result from a variety of causes. For example, stress conditions may be induced by relatively high temperatures and/or relatively high fluid pressures encountered inside cemented wellbore pipe strings during operations such as perforating, stimulation, injection, testing, production, and so on. Stress conditions may also be induced or aggravated by fluctuations or cycling in temperature or fluid pressures during similar operations. Variations in temperature and internal pressure of the wellbore pipe string may result in radial and longitudinal pipe expansion and/or contraction which tends to place stress on, among other things, the annular cement sheath existing between the outside surface of a pipe string and the inside formation surface or wall of a wellbore. Such stresses may also be induced in cement present in other areas of the wellbore in the pipe.

In other cases, cements placed in wellbores may be subjected to mechanical stress induced by vibrations and impacts resulting from operations, for example, in which wireline and pipe conveyed assembly are moved within the wellbore. Hydraulic, thermal and mechanical stresses may also be induced from forces and changes in forces existing outside the cement sheath surrounding a pipe string. For example, overburden and formation pressures, formation temperatures, formation shifting, formation compaction, etc. may cause stress on cement within a wellbore.

Conventional wellbore cements typically react to excessive stress by failing. "Cement failure" refers to cracking, shattering, debonding from attached surfaces (such as exterior surfaces of a pipe string and/or the wellbore face), or otherwise losing its original properties of strength and/or cohesion. Stress-induced cement failure typically results in loss of formation isolation and/or loss of wellbore mechanical integrity, such as casing collapse or shearing of the casing. This in turn may result in loss of production, loss of the wellbore, pollution, and/or hazardous conditions.

Although hydraulic, thermal and/or mechanical induced stresses may be encountered in all types of wells, including those having conventional vertical wellbores, such stresses may be more likely to occur in particular types of completion configurations. For example, completions having relatively thin annular cement sheaths between pipe strings and/or between the outside surface of a pipe string and the inside formation wall may be particularly susceptible to stress-induced cement damage. Such thin cement sheaths may be encountered, for example, in conditions where open hole wellbore size is limited, yet a cemented pipe string diameter must be maximized. Examples include those cases where so called "slim" well architectures are employed or tieback/scab liners are cemented, for example, to isolate casing damage and/or substantially eliminate formation pressure and/or fluid communication.

In other cases, a main or primary wellbore may have one or more secondary wellbores extending laterally therefrom to form a lateral or multi-lateral completion. In such cases, a primary wellbore may be vertical or deviated (including horizontal), and one or more secondary lateral wells are drilled from the primary wellbore after it has been cased and cemented. Each of the secondary lateral wellbores may be vertical or deviated, and may optionally include a cemented liner, which may be tied into the primary wellbore. In this regard, secondary lateral wellbores may be drilled from a primary wellbore initially, and/or at any other time during the life of the well. Such lateral or multi-lateral completions may be particularly susceptible to stress induced cement failures for a number of reasons. For example, the juncture between the primary and secondary lateral wellbores is typically exposed to mechanical stresses induced by a large number of subsequent operations involving the running of tools through the junction point. The number of operations and exposure to stress typically increases with the number of secondary lateral wellbores extending from the primary wellbore. Furthermore, the magnitude of mechanical stress from a given operation typically increases with the angle of deviation between the axis of the primary wellbore and the a given secondary lateral wellbore.

When conventional cements are employed in lateral or multi-lateral wellbore completions, the set conventional cement is typically too brittle to withstand shocks and impacts generated by drilling and other well operations performed in the secondary lateral wellbores. Therefore, in such completions, conventional set cement compositions typically fail by shattering or cracking, resulting in loss of isolation and mechanical integrity. Potential for such stress-induced cement failure typically increases, for example, in those situations in which the internal diameter of a cased secondary lateral wellbore is designed to be as close as possible to the internal diameter of the cased primary wellbore. This is typically done for ease of drilling and completion, but results in a cement sheath having a reduced thickness, and therefore which is more susceptible to damage.

Similar cement failure problems may be encountered in single wellbores having relatively thin cement sheaths (such as "slimhole" completions), and/or other configurations which cause an increase in the magnitude of frequency of mechanical stresses including wellbores having deviations or doglegs at which mechanical impact may be concentrated. Examples of such wellbores include highly deviated or horizontal completions, and/or sidetracked wellbores.

In other cases, injection or production of high temperature fluids may cause thermal expansion of trapped fluids located, for example, between a pipe string and a cement sheath, between a cement sheath and the formation, and/or within the cement sheath. Such trapped fluids may create excessive pressure differentials when heated and/or cooled, resulting in cement failure. Thermal cycling (such as created by intermittent injection or production of fluids that are very warm or cool relative to the formation temperature), typically increase the likelihood of cement failure.

In still other cases, mechanical and/or hydraulic forces exerted on the exterior of a cement sheath may cause stress-induced cement failure. Such forces include overburden pressures, formation shifting/compaction, and/or exposure to overpressured fluids within a formation. Increased pressure differential, such as may be caused when the interior of a cemented pipe string is partially or completely evacuated of liquid, also tends to promote cement failure, especially when combined with relatively high pressures exerted on the exterior of a cement sheath surrounding the cemented pipe string. Pressure changes may also be the result of natural formation pressure depletion or hydraulic fracturing operations.

In addition, any type of thermal, mechanical or hydraulic stress that acts directly on a set cement composition, or which tends to cause deformation of a wellbore tubular in contact with a set cement composition may promote, or result in, failure of a conventional cement composition.

Furthermore, types of cement configurations that may be adversely affected by stresses, such as those discussed above, include not only annular cement sheaths placed by circulation, but also include cement compositions introduced into a wellbore by a variety of other methods. Such other methods include those employed during or after completion, for example, as part of remedial, workover or abandonment operations. Specific examples include cement placed by squeezing or spotting, to for example, seal off perforations or casing leaks. Presence of high perforation densities may also contribute to cement failure before or after perforation, by explosive force and/or by mechanically weakening a pipe string or tubular so that it is more susceptible to deformation by stress. Such cement configurations may be particularly susceptible to mechanical damage.

The physical properties of set hydraulic cements, including Portland cement, are related to the crystalline structure of the calcium silicate hydrates formed during hydration. Conventional Portland cement reacts with water to form an interlocking crystalline network of various calcium silicate hydrates (CSH), calcium hydroxide (CaOH), calcium sulfo-aluminate and other minor constituents. This interlocking crystalline network provides the compressive strength, tensile strength, and flexural strength of the set cement.

In exploring methods to improve the strength of cement compositions, the civil engineering literature has extensively discussed the presence of interfacial transition zones (ITZ), regions approximately 50 micrometers wide formed around the aggregates in concrete. Essentially, this is a zone having a high porosity that is characterized by a higher CaOH concentration and lower concentrations of CSH than typically found in the matrix of the cement. These porosity structures are commonly viewed to be the "weak link" in concrete regarding its mechanical properties and durability. The micro-structural development of the ITZ is due to the inefficient formation of the hydration products near the aggregate surface and the omni-directional growth effect of the CSH where hydration products are forming from one direction only, in contrast to the matrix of the cement, where hydration products are growing inward from all directions at any given point.

Modifications of the ITZ have been reported with the goal of reducing or eliminating the ITZ. These modifications include reducing the width of the ITZ, or reducing the porosity gradient of the ITZ relative to the bulk material. The addition of silica fume to concrete results in ITZs that are nearly as dense as the bulk paste. This is believed to be due to the small size and reactivity of the silica fume particles allowing packing more closely to the aggregate surface and reducing the one sided growth effect. Similar reductions in the width of the ITZ have been discussed using fly ash and rice husk ash.

Previous work, as is described in U.S. Pat. No. 7,156,173, which is incorporated herein in its entirety, has shown that the ITZ's of individual silica sand particles serve to direct the fracture path within the cement matrix by, in essence, beginning a series of "defects" producing a non-linear fracture pattern within the cement matrix. The fracture itself is in close proximity to, if not in direct contact with, the particle producing the ITZ.

Once fractured however, hydraulic cement has no ability to seal the hydrocarbon flow path that has been created. What is needed is a composition and method of producing a self-sealing cement that minimizes or mitigates the unwanted migration of water or hydrocarbons.

SUMMARY OF THE INVENTION

What is disclosed is a composition and method of producing a self-sealing cement that minimizes or mitigates the unwanted migration of water or hydrocarbons.

In one embodiment, a cement composition is provided including a cement and a low reactivity particle coated with a swellable polymeric material. The low reactivity particle is coated with a swellable polymeric material at a concentration of about 10 weight percent to about 50 weight percent, and preferably about 15 weight percent to about 30 weight percent, based on the weight of the cement. The swellable polymeric material swells to a larger volume when exposed to one or more hydrocarbons, depending on the selected polymeric material. Examples of such polymeric materials includes, without limitation, polyurethane, butyl rubber, butadiene, isoprene, natural rubber, EPDM (ethylene propylene diene monomer), and silicose.

In another embodiment, a method for cementing an oil or gas well is provided. The method includes providing a cement composition including a cement and a low reactivity particle coated with a swellable polymeric material. The low reactivity particle is coated with a swellable polymeric material at a concentration of about 10 weight percent to about 50 weight percent, and preferably about 15 weight percent to about 30 weight percent, based on the weight of the cement. The composition is then pumped into the wellbore and allowed to set. The resulting set cement composition is self-sealing in that the swellable polymeric material swells to a larger volume when exposed to one or more hydrocarbons, depending on the selected polymeric material.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

FIG. 1 shows the change in methane permeability over time of a fractured cement composition of the present invention.

DETAILED DESCRIPTION OF THE INVENTION

Novel cement compositions are disclosed. The compositions can be used in downhole oil and gas well applications, as well as in conventional construction applications. The compositions are especially attractive for use in environments that experience high temperature, high pressure, and tectonic forces.

While compositions and methods are described in terms of "comprising" various components or steps, the compositions and methods can also "consist essentially of" or "consist of" the various components and steps.

Cement Compositions

One embodiment of the present invention is directed towards cement compositions. The compositions can be dry (prior to the addition of water) or wet (after the addition of water). The compositions generally comprise cement and low reactivity particles coated with a hydrocarbon swellable material.

The cement can generally be any type of Portland cement. The cement can generally be of any API specification Class such as A, B, C, G, or H. Examples of commercially available cements include Lafrage's Joppa Class H, Dyckerhoff Class G, and Cemex Class C. ASTM specification cements such as I, II, III, IV, and V can also be used. Other suitable hydraulic cements include commercial lightweight cements such as TXI Lightweight can be used. Other cementitious materials such as ground granulated blast furnace slag, Class C or Class F fly ash, pozzolan microspheres, or ceramic microspheres may also be included in the cement compositions.

The low reactivity particles can generally be any low reactivity material, such as silica sand ($SiO_2$), zeolites, aluminum silicates, other minerals, gilsonite (resinous hydrocarbon), ground coal, adamantanes, or fullerenes. Particle sizes are often determined by a "mesh" number. Numbers correlate to a screen or mesh having that number of openings per square inch. For example, a 20 mesh screen has 20 openings per square inch, while a 325 mesh screen has 325 openings per square inch. The higher the number, the smaller the size of the openings. The size of the particles is preferably about 40 mesh to about 250 mesh (i.e. most of the materials pass through a 40 mesh screen but are larger than a 250 mesh screen). Specific examples of particle sizes include about 40 mesh, about 50 mesh, about 100 mesh, about 150 mesh, about 200 mesh, about 250 mesh, and ranges between any two of these values. The weight percent of the low reactivity particles based on the weight of the cement can be about 30% to about 100%. Specific examples of the weight percent include about 30%, about 40%, about 50%, about 60%, about 70%, about 80%, about 90%, about 100%, and ranges between any two of these values.

The hydrocarbon swellable material can be any material known to swell upon contact with hydrocarbons, including but not limited to polyurethane, butyl rubber, butadiene, isoprene, natural rubber, EPDM (ethylene propylene diene monomer) or silicose. A preferred hydrocarbon swellable material is BAYMOD® N VP KA 8641, marketed by LANXESS Corporation of Pittsburgh, Pa. BAYMOD® N VP KA 8641 is a spray dried precrosslinked acrylonitrile-butadiene rubber (NBR) with calcium carbonate as separating agent. The weight percent of the hydrocarbon swellable polymer based on the weight of the cement can be from about 10% to about 50%, and preferably from about 15% to about 30%. One skilled in the art will appreciate that the optimal concentration depends upon the amount required to populate the cement matrix with sufficient "defects" for directional control of the fracture in addition to the amount of needed for adequate contact with the fracture system. The hydrocarbon swellable material can be applied to the low reactivity particle by any means known in the art, and preferably by spray drying on a substrate.

Water can generally be added in any amount sufficient to form a pumpable slurry. Generally, the water can be about 30% to about 150% by weight based on the weight of the cement. Specific examples of the weight percent include about 30%, about 40%, about 50%, about 60%, about 70%, about 80%, about 90%, about 100%, about 110%, about 120%, about 130%, about 140%, about 150%, and ranges between any two of these values.

The cement compositions can further comprise additives such as dispersants, salts, set retarders, gas control agents, free fluid control agents (such as biopolymers), weighting materials (such as hematite), fluid loss agents (such as hydroxyethylcellulose and AMPS copolymers), bonding agents (such as polyvinyl alcohol), extenders (such as sodium montmorillonite, sodium metasilicate, sodium silicate, and the like), reinforcing agents, and gels. Reinforcing agents can include wollastonite, pyrophyllite, sepiolite, carbon whiskers, polypropylene whiskers, and nylon whiskers.

Methods of Use

The above described cement compositions can be used in methods to prepare cement or concrete structures. The cement compositions can be mixed with water or a water based fluid to prepare a slurry, and cast into a wide array of shapes and structures. Sand, gravel, or other solid materials can be added to the cement compositions to prepare a slurry.

A presently preferred embodiment involves methods of using the above described compositions in cementing in oil and gas wells. The cement compositions can be mixed with water or a water based fluid to prepare a slurry, and the slurry can be introduced into a wellbore by pumping or other methods. The mixing and introducing steps can be performed in a batch or continuous fashion. The slurry would preferably be allowed to set within the wellbore for a sufficient time.

The above described cement compositions can also be used to prepare other cement or concrete structures such as buildings, bridges, roads, driveways, columns, marine structures, and so on.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Preparation of Fractured Cement Samples

Joppa H cement is commercially available from Lafarge's Joppa Illinois plant. Cements are commonly referred to by an API specification class. The class is assigned based upon, among other characteristics, the percentage of water in the cement. Class A has 46%, B has 46%, C has 56%, G has 44%, and H has 38%. In the examples presented herein, Joppa Class H cement is used. Cement samples were prepared in accordance with API Recommended Practice 10B, 22nd edition, December 1997.

LANXESS BAYMOD® N VP KA 8641 was added to Joppa Class H cement so that the percentage of additive was 15% (i.e. 15 pounds additive per 94 pounds of cement). The samples were cured at 140° F. and 3000 psi in core molds (1" diameter×2" length) for 72 hours. The samples were released from the molds and fractured prior to testing. Fracturing was accomplished by a chisel impact along a scored edge. The fractured molds were re-connected and wrapped with Teflon and confined with an external device for testing.

It should be noted that mechanically induced fractures used for testing, such as in the present examples, are likely much wider than those expected downhole. Accordingly, one of ordinary skill in the art will appreciate that examples disclosed herein represent a very severe case and are illustrative of the benefits achievable using the compositions and methods of the present invention.

Example 2

Permeability Testing of Fractured Samples

Testing was performed on the mechanically fractured cement samples. Flow testing was performed at ambient temperature with commercial grade methane gas (93% methane). Confining stress and injection pressure were varied to keep the effluent gas rate at less than 60 cm$^3$/min. Differential pressure was monitored over time.

Permeability is a measure of the ability of a material, in this case the fractured cement samples) to transmit a fluid. With the differential pressure measured for the cement sample tests, permeability was calculated using Darcy's Law. Darcy's law is a simple proportional relationship between the instantaneous discharge rate through a porous medium, the viscosity of the fluid, and the pressure drop over a given distance:

$$Q = \frac{-\kappa A}{\mu} \frac{(P_b - P_a)}{L}$$

where Q=the total discharge (units of volume per time, e.g., cm$^3$/min); κ=the permeability of the fractured cement sample (measured in mD or milliDarcy); A=the cross-sectional area of the fractured cement sample; $(P_b-P_a)$=the pressure drop across the cement sample; μ=the viscosity of the methane gas; and L=the length of the cement sample.

FIG. 1 illustrates the change in permeability of methane gas over time through a first fractured cement sample. The data demonstrates a consistent reduction in permeability from approximately 0.775 mD (point A) at the start of the test to about 0.722 mD (point B) roughly 4.5 hours later. After being shutoff overnight with methane locked in place, methane flow was resumed the next day with permeability beginning at approximately 0.577 mD (point C). Methane flow continued for approximately 7.5 hours, with a consistent reduction in permeability to approximately 0.426 mD (point D).

In this way, should a cement sheath be compromised due to induced stress and the flow of hydrocarbons initiated through the induced fracture system, the swellable polymer material on the particle surface will serve to seal the fracture sufficiently to minimize or mitigate the hydrocarbon flow. The data illustrated in FIG. 1 demonstrates the reduced permeability of the fracture over time due to the continued exposure of the swellable polymer to hydrocarbon, in this example methane.

One of ordinary skill in the art would expect such an induced fracture system would completely or near completely seal given an adequate amount of time. One of ordinary skill in the art would also appreciate that the type of polymer and the amount of polymer can be selected without undue experimentation based on these teachings to mitigate the loss of different types of hydrocarbons. One of ordinary skill in the art will also appreciate that water loss can also be prevented by use of water swellable polymers, however this would require the water swellable polymer to be further coated to prohibit contact with water until the cement is set.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

What is claimed is:

1. A cement composition comprising:
   cement; and
   a low reactivity particle coated with a swellable polymeric material;
   wherein the low reactivity particle coated with a swellable polymeric material is present at a concentration of about 10 weight percent to about 50 weight percent, based on the weight of the cement and wherein the swellable polymeric material swells to a larger volume when exposed to one or more hydrocarbons.

2. The cement composition of claim 1, wherein the low reactivity particle coated with a swellable polymeric material is present at a concentration of about 15 weight percent to about 30 weight percent, based on the weight of the cement.

3. The cement composition of claim 1, wherein the swellable polymeric material is selected from the group consisting of polyurethane, butyl rubber, butadiene, isoprene, natural rubber, EPDM (ethylene propylene diene monomer), and silicose.

4. The cement composition of claim 1, wherein the cement is API Class A cement, API Class B cement, API Class C cement, API Class G cement, or API Class H cement.

5. A method of cementing an oil or gas well, the method comprising:
   providing a cement composition comprising water, cement, and a low reactivity particle coated with a swellable polymeric material; wherein the low reactivity particle coated with a swellable polymeric material is present at a concentration of about 10 weight percent to about 50 weight percent, based on the weight of the cement and wherein the swellable polymeric material swells to a larger volume when exposed to one or more hydrocarbons,
   pumping the composition into the well; and
   allowing the composition to set.

6. The cement composition of claim 5, wherein the low reactivity particle coated with a swellable polymeric material is present at a concentration of about 15 weight percent to about 30 weight percent, based on the weight of the cement.

7. The cement composition of claim 5, wherein the swellable polymeric material is selected from the group consisting of polyurethane, butyl rubber, butadiene, isoprene, natural rubber, EPDM (ethylene propylene diene monomer), and silicose.

8. The cement composition of claim 5, wherein the cement is API Class A cement, API Class B cement, API Class C cement, API Class G cement, or API Class H cement.

9. A method for mitigating loss of hydrocarbon containment due to induced cement fracture, comprising:
   providing a cement composition comprising water, cement, and a low reactivity particle coated with a swellable polymeric material; wherein the low reactivity particle coated with a swellable polymeric material is present at a concentration of about 10 weight percent to about 50 weight percent, based on the weight of the cement and wherein the swellable polymeric material swells to a larger volume when exposed to one or more hydrocarbons,
   pumping the composition into the well; and
   allowing the composition to set.

10. The cement composition of claim 9, wherein the low reactivity particle coated with a swellable polymeric material is present at a concentration of about 15 weight percent to about 30 weight percent, based on the weight of the cement.

11. The cement composition of claim 9, wherein the swellable polymeric material is selected from the group consisting of polyurethane, butyl rubber, butadiene, isoprene, natural rubber, EPDM (ethylene propylene diene monomer), and silicose.

12. The cement composition of claim 9, wherein the cement is API Class A cement, API Class B cement, API Class C cement, API Class G cement, or API Class H cement.

* * * * *